April 2, 1968     W. W. KRAFT ETAL     3,376,115

REGENERATIVE MASS

Filed Sept. 24, 1964     2 Sheets-Sheet 1

INVENTOR.
WHEATON W. KRAFT
JOHN J. SCHORSCH
BY

*Flynn Marn & Jangarathis*

ATTORNEYS

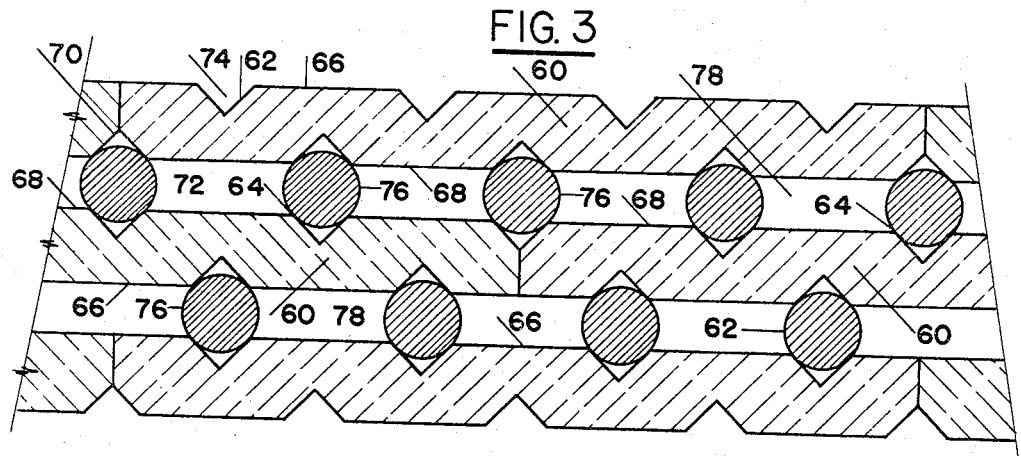
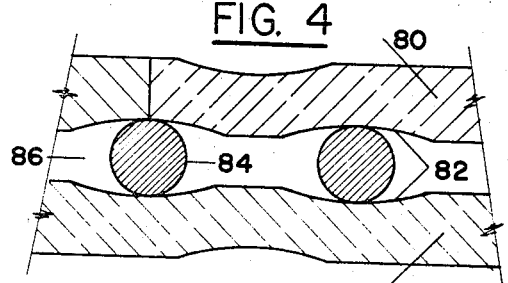
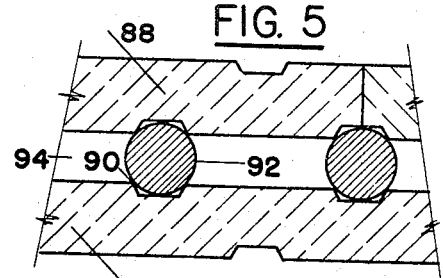
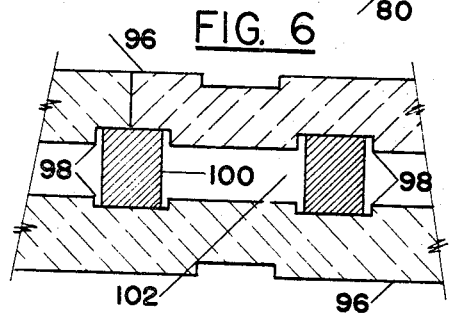
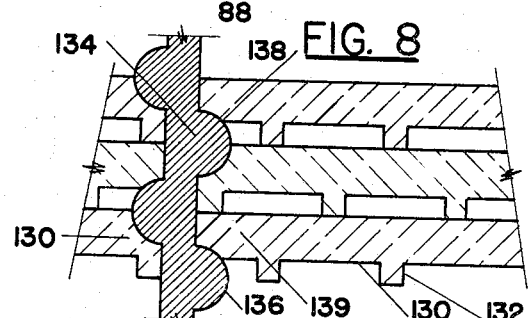
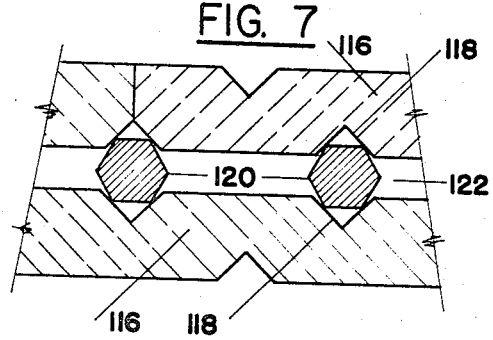
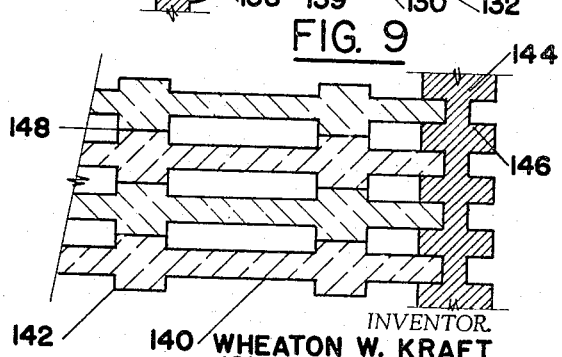

United States Patent Office 3,376,115
Patented Apr. 2, 1968

3,376,115
REGENERATIVE MASS
Wheaton W. Kraft, Scarsdale, N.Y., and John J. Schorsch, Matawan, N.J., assignors to The Lummus Company, New York, N.Y., a corporation of Delaware
Filed Sept. 24, 1964, Ser. No. 399,034
14 Claims. (Cl. 23—277)

This invention relates, in general, to new and improved regenerative furnaces for carrying out processes for altering gaseous reactants and, more particularly, to new and improved regenerative tiles for such furnaces.

Regenerative furnaces are designed to conduct reactions in which gases are heated to high temperatures for the purpose of producing desirable end products and then cooled to arrest further reaction. When such reactions are endothermic, energy usually in the form of heat, must be supplied to maintain the reaction. This may conveniently be done by exothermic combustion of fuel with normal or enriched air or oxygen in the reaction apparatus. In order to prevent undesriable dilution of the reaction products by combustion gases of the exothermic heating reaction, the endothermic and exothermic steps are carried out separately and alternately in the same apparatus.

It is well known that reactions of this type can be conducted by passing reactive gases through a refractory mass which has been heated to a temperature above that required for the reaction. The endothermic reaction heat is supplied to the flowing reactive gases, as well as the heat required to bring them to reaction temperature, by removal of heat from the heated refractory mass with a consequent lowering of the temperature of the refractory mass. It is also well known that the heat removed from such refractory mass can be restored thereto by such means as the combustion of fuel with consequent increase in the temperature of the mass.

To prevent mixing of the endothermic reaction and the gases from the combustion step, the apparatus is alternately operated, first on the combustion part of the cycle and then on the reaction part of the cycle. The cooling and quenching of the desired reacted gases can also be conveniently accomplished by the rapid surrendering of their heat content to a second refractory mass maintained at a temperature lower than that of the products of the endothermic reaction. The second mass may be alternately air cooled prior to entry of the reacted gases to be cooled. It is obvious that the air used to cool the second mass is preheated and may therefore be advantageously used in the combustion part of the cycle to increase overall thermal efficiency. The combination of these steps and requirements result in a so-called regenerative furnace comprising two refractory masses with means for introducing fuel for combustion between said masses. The regenerative furnaces operate on an alternating and recurrent two part cycle which may appropriately be designated as a "heat-and-make" cycle, as follows:

Part 1.—Preheating air by flowing it through a first refractory mass, injecting fuel into preheated air, and heating a second refractory mass by the resulting products of combustion;

Part 2.—Carrying out an endothermic reaction and quenching the products of such reaction in which heat is supplied to the gases to be reacted by passing them through the hot second refractory mass, in an opposite direction to the direction of the products of combustion of the preceeding part of the cycle, and then through the first refractory mass, in an opposite direction to the direction of the air flowing therethrough during the preceeding part of the cycle, which quenches the reacted gases by transferring heat from said gases to the first refractory mass.

By suitable control means, an exact balance can be maintained in the above two part cycle between the heat removed from the refractory masses during the endothermic reaction and the heat restored to such masses by the combustion reaction. More uniform temperature conditions in the regenerative furnace can, however, be maintained by using a four part cycle in which tendencies for temperature drifts through the mass are eliminated by self compensation, due to the complete symmetry of an alternating and recurrent four part cycle. The four part cycle will also be designated as a "heat-and-make" cycle and for a dual refractory mass furnace, with means for introducing fuel for combustion between said masses, includes:

Part 1.—Heating the first mass in one direction;
Part 2.—Making a reaction product in the first mass in the opposite direction;
Part 3.—Heating the second mass in one direction;
Part 4.—Making a reaction product in the second mass in the opposite direction.

The four part cycle however, has the disadvantage over the two part cycle in that the temeprature at any point in the mass rises or falls in two steps. Therefore, all other factors being unchanged, the range of the temperature variation in the four part cycle will be about twice that in the similar two part alternation from cooling to heating to cooling.

In prior art furnaces, the conduits which passed through the regenerative masses had a limited contact area for heat transfer purposes. Thus, only a small portion of the heat of the regenerative masses could be transferred to the gases or vice versa. The making of larger conduits was not an answer to the problem, as would merely have created uneven heating of the gases. The gases in the center of the conduits would have been heated to a lesser extent than the gases in immediate surface contact with the regenerative masses.

Accordingly, it is a general object of the present invention to overcome these and other difficulties of prior art furnaces by the provision of a novel regenerative furnace structure and refractory mass therefor.

A further object of the present invention is to provide a furnace and combustion apparatus for more efficiently carrying out processes involving endothermic gaseous reaction.

Another object of this invention is the provision of a new and better regenreative furnace in which more gases can be efficiently passed through a regenerative mass without variations in the temperature gradient for the gases.

Still another object of this invention is the provision of a new and better regenerative mass for regenerative furnaces which is efficient in operation by reason of a better heat transfer characteristic and an increase in the capacity of gas which can be passed therethrough.

A further object of this invention is the provision of regenerative mass having the aforesaid characteristics which is simple to manufacture and easy to install.

A still further object of this invention is the provision of a new and better regenerative mass for a regenerative furnace in which all the foregoing is achieved with the addition of a more rigid construction for the regenerative mass.

Another object is the provision of a new and better regenerative mass for combustion apparatus which eliminates clogging of gas passage due to carbon accumulation.

Various other objects and advantages of the invention will become clear in the course of the following description of several embodiments thereof, and the novel features will be particularly pointed out in connection with the appended claims. A better understanding of the invention will be gained by referring to the following description in conjunction with the accompanying drawings, which are illustrative only and are not to be interpreted in a limiting sense, and in which:

FIGURE 3 is a partial cross section of the regenerative mass of the invention taken along lines 3—3 of FIGURE 1;

FIGURES 4 through 9 are partial cross sectional views similar to FIGURE 3 showing six additional embodiments of the present invention.

Figure 1:
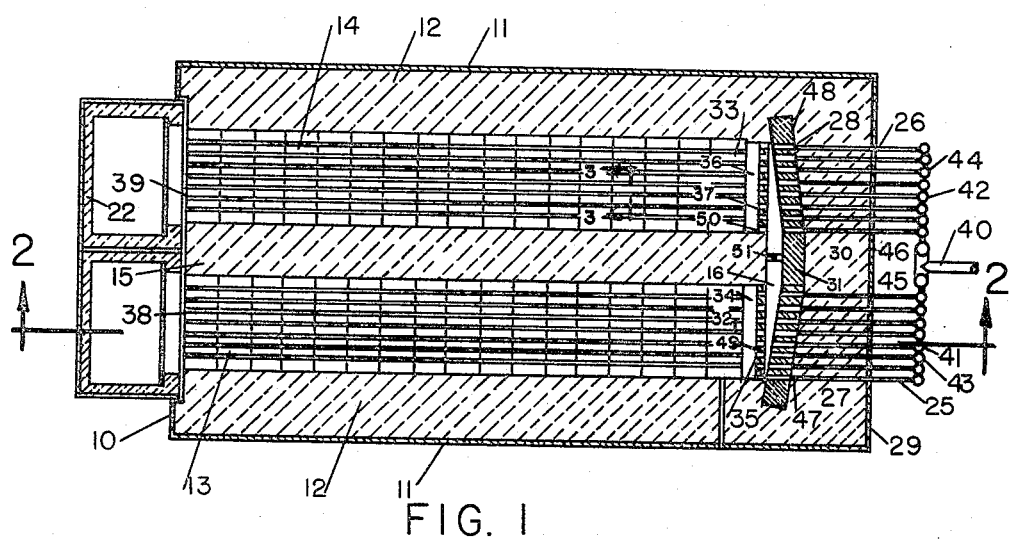
FIGURE 1 is a horizontal section of a first embodiment of the apparatus of the present invention taken along lines 1—1 of FIGURE 2.
Figure 2:
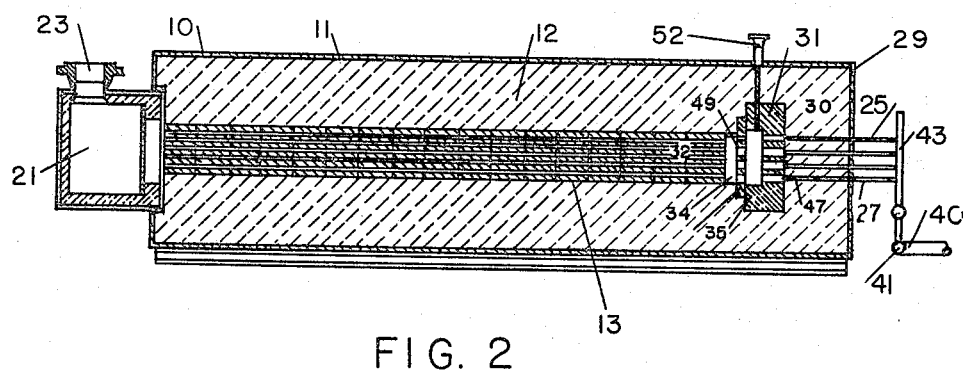
FIGURE 2 is a side elevation of the furnace of FIGURE 1 in cross section along lines 2—2 of FIGURE 1.

In FIGURES 1 and 2, the furnace 10 is illustrated as including a shell 11 preferably formed of steel and having a heat insulating lining 12. Placed inside the lining are two regenerative masses 13 and 14. These masses will be described in detail with respect to FIGURE 3. The masses 13 and 14 are separated by a heat insulating wall 15. It will be understood that the masses may be disposed in any other manner, for example, perpendicular to each other at their combustion end. The masses 13 and 14 are joined at one end by a chamber or combustion space 16. Each of the masses is comprised of suitable refractory elements which permit the flow of gases therethrough and are capable of storing and releasing heat quantities involved in the process conducted in the furnace.

As shown in FIGURE 3, each of the regenerative masses 13 and 14 use rectangularly shaped regenerative tiles 60 arranged in side to side relation in alternate courses. Each of the tiles 60 has three V-notches 62 on one surface 66 thereof. The grooves 62 are equally spaced from the side edges of the tile 60. Intermediate the grooves 62 on the other surface 68 of the tile 60 there are placed longitudinally extending parallel V-grooves 64 which are one less in number than the grooves 62. Also on the surface 68 along the side edges there are provided mitered surfaces 70. It will be seen that when two adjacent tiles 60 are in side edge to side edge relation with their surfaces 66 and 68 co-planar, the mitered surfaces 70 form a V-groove on the co-planar surface 68 which is equally spaced between the grooves 64 and which extends the length of the tiles.

For the purpose of illustration, two courses of bricks 72 and 74 will be discussed in detail. The course 74 is above course 72 and includes tiles 60 which have their surface 68 in facing relation with the surface 68 of the tiles in course 72. Similarly, the surfaces 66 of the tiles 60 in courses 72 and 74 will face the surfaces 66 of tiles in the next adjacent course.

Between the faces 68 of courses 72 and 74 there are placed cylindrical refractory rods 76 which may extend the length of the regenerative masses 13 and 14 and which fit within the grooves 64 and the groove formed by the miter surfaces 70. Similar rods 76 are also placed between the mating grooves 62. It should be noted that the rods 64 being circular in cross section have only line contact with the grooves 64. Further, the rods 64 are of sufficient size to cause a gap 78 to be formed between adjacent courses 72 and 74. Gases can thus readily flow through the gaps 78. In practice the length of rods 76 may be varied in accordance with their strength and ease of fabrication. It is only important that the ends of individual rods not all fall in the same plane of tiles and form a weak zone (i.e. they should be staggered).

Thus, it can be seen that gases passing between the tiles will have full area contact with the regenerative tiles so that maximum heat transfer can be accomplished. Further, the gap 78 is narrow so that there will be a substantially even temperature gradient across the gases in the gap as they pass therethrough. Still further, the straight, continuous passage formed by gaps 78 allows a higher volume of gas to pass than the tortuous path presents by conventional checkerwork.

Plenum chambers 21 and 22 and piping connections 23 and a connection similar to connection 23 (not shown) are provided for the introduction and withdrawal of gases to and from the ends of the regenerative masses opposite to the combustion space. Chamber 16 is provided with fuel injecting means 25 and 26 which may comprise channels 27 and 28 respectively for gaseous or liquid fuel. These channels project through end wall 29 and the end refractory liner 30 with their injection means 27 firing through holes in refractory liner 31 toward the end 32 of regenerative mass 13 and the injection means 28 firing through liner 31 toward the end 33 of regenerative mass 14. The conduits 19 of mass 13 are connected through chamber 34 and the flues of baffle 35 to chamber 16 while the flues of mass 14 are connected through chamber 36 and the flues of baffle 37 to chamber 16.

In carrying out any endothermic alteration process wherein the reactants must be heated, reacted, and quenched, the operation of the furnace is cyclic and in brief, consists of an endothermic reaction step and a heating step in one direction followed by an endothermic reaction step and heating step in the reverse direction for a four part cycle. The time of these steps may be varied according to needs.

Initially assuming mass 13 to be heated and mass 14 to be cooled, a description of the complete cycle follows:

(a) A gas to be reacted is introduced at the front end 38 of mass 13 and flows therethrough, pyrolysis occurs and reacted gas is withdrawn from the back end 32 of said mass and passed through baffle 35, chamber 16 and baffle 37 to end 33 of mass 14 wherein during flow to end 39 of said mass it is quenched below a temperature at which no further reaction occurs.

(b) Air is next introduced at the front end 38 of the mass 13 and is preheated by the removal of heat from said mass before reaching combustion space 16. Fuel gases admitted to the combustion zone through injectors 27 and hot gases pass through baffle 37 and heat the refractory mass 14 in passing through and out of the front end 39 of said mass.

(c) The preceding pyrolysis step (a) is repeated, with flow of gases in the opposite directions, that is, gas to be reacted is introduced at end 39 of mass 14 and quenched reacted gas withdrawn from end 38 of mass 13.

(d) The preceding combustion step (b) is repeated, with flow of air and flue gases in the opposite direction, that is, air is introduced at end 39 of mass 14 and cooled products of combustion withdrawn from end 38 of mass 13.

When the furnace of the invention is operated efficiently in accordance with the above outlined regenerative process cycle, it is obvious that prior to high temperature reaction in either refractory mass 13 or 14 such mass must be quickly heated to high temperatures. To accomplish the required high temperature heating, hot combustion gases give up heat to regenerative mass 13 or 14. During the burning of heating fuel and heating of a regenerative mass it is important that no carbon be deposited on the surfaces 66 and 68 of the regenerative tiles 60 which would result in the clogging of the gaps and thus causing decrease in throughput. It should be noted that by providing the gaps 78 as straight, narrow channels, chances of such clogging have been substantially eliminated. Of course, it is also important that the combustion of the heating fuel be as complete as possible to achieve maximum economy and efficiency of fuel utilization.

Substantially complete and intimate mixing of fuel and combustion supporting gases followed by complete combustion thereof in a minimum combustion space is achieved with the furnace 10 with the result that the regenerative mass to be reheated is quickly restored to a condition to provide a high temperature heat source in which there is nearly uniform temperature across the mass normal to the flow of gases therein. The new uniform temperatures available at any point in any such transverse cross section of the mass results in a substantially increased yield of desired reaction products.

As shown in FIGURES 1 and 2, two groups of injectors 27 and 28 project through end casing 29 of furnace 10 and refractory line 30. Fuel is supplied to the injectors through supply line 40, headers 41 or 42 and lines 43 or 44 as directed by valves 45 and 46. Fuel is ejected from each of the injectors 27 or 28 through openings 47 or 48, respectively, in refractory liner 31 and across the combustion chamber 16 and is preferably directed through openings 49 or 50 in mixing baffles 35 or 37 respectively. Each of the injectors may operate at near sonic velocity so that the fuel will remain in a high velocity stream at least until it has approached openings 49 or 50 in baffle 35 or 37. Alternatively, openings 47 and 48 in the refractory liner 31 may constitute the injection means with injectors 27 and 28 withdrawn to a point nearer end casing 29 of furnace 10.

Combustion gases pass through either mass 13 or 14 and are preheated as they approach channel 34 or 36 and usually enter such chambers at a much lower velocity than the fuel exiting from openings 47 and 48.

As fuel in a plurality of streams approaches either chambers 34 or 36, it penetrates the air flow from such chambers and intimately mixes with the streams of preheated air. The mixture of preheated air and fuel ignites and combustion continues as the mixture passes through chamber 16. The hot combustion reactants and/or products are further mixed as they pass through the baffle 35 or 37 prior to entry into the regenerative mass 13 or 14 respectively, to be heated. Further mixing of the combustion reactants can be obtained by providing an intermediate mixing baffle 51. For initial ignition purposes, a pilot light 52 may be provided in chambers 16.

Specifically, in the operation where mass 14 is to be heated, fuel is injected from injectors 27 toward chamber 34 and is mixed with preheated air from mass 13. The air-fuel mixture is ignited with the resulting hot combustion gases flowing towards mixing baffles 37. The hot mixed combustion gases passing through baffle 37 are uniformly distributed in the gaps 78 across the entire width of the mass 14 giving up their heat to said mass uniformly as they flow therein toward chamber 42. Relatively cool combustion gases are removed from chamber 22 through an outlet similar to outlet 23.

Subsequent to the heating of mass 14, feed gases to be converted are passed through such mass from end 39 to chambers 36. Gases leaving mass 14 pass through baffles 37 and 35 and are then quickly cooled to below the reaction temperature by contact with the relatively cool mass 13 from which they exit at end 38. The cooling is uniform across the width of the mass due to the spacing of the tiles 60 by the rods 76 which leaves the uniform gaps 78. The heating, cracking and quenching recurrent cycle is repeated alternately from mass 13 to mass 14.

Where an endothermic alteration reaction based upon a two part cycle operation is to be carried out in the apparatus, only one set of fuel injectors is required, depending upon the single flow direction chosen for the feed material being reacted, the flow of gases in the heating step being in the other and reverse direction. Where reheating occurs by flowing hot combustion gases through mass 13, only injectors 28 are necessary, whereas when reheating occurs by flowing hot combustion gases through mass 14, only injectors 27 are used.

FIGURE 4 shows an alternative type of regenerative mass which might be utilized in the furnace 10. In FIGURE 4, there are shown a plurality of tiles 80 having arcuate grooves 82 whose radius is larger than the radius of the rod 84 placed therebetween. Rod 84 spaces the tiles 80 to form a gap 86. The rod 84 has only line contact with the grooves 82 thus insuring maximum flow area between the tiles 80.

FIGURE 5 is a third embodiment of the present invention in which another type of regenerative mass is substituted for the regenerative masses 13 and 14 of FIGURES 1–3. In FIGURE 5, the regenerative mass is shown as formed of tiles 88 each having on their facing surfaces longitudinally extending grooves 90 which are semi-hexagonal in cross section. By utilizing a cylindrical rod 92 as a spacing means, the tiles 88 will be separated to form a gap 94 while there will only be line contact between the rod 92 and the semi-hexagonal grooves 90.

In FIGURE 6, there is shown a further embodiment of the present invention in which tiles 96 are utilized having longitudinally extending grooves 98 which are rectangular in cross section and which have a depth less than half the depth of the rod 100 fitting between the groove 98. Rod 100 is rectangular in cross section. Thus, the depth of the rod 100 and the depth of the groove 98 will determine the thickness of the gap 102 formed between the tiles 96.

FIGURE 7 is a still further embodiment of the present invention in which tiles 116 are shown having V-grooves 118 on the surfaces thereof. The tiles 116 are substantially similar to the tiles 60 of FIGURES 1–3. However, a rod 120 is provided for the grooves 118 which is hexagonal in cross section. With such hexagonal shape, the rod 120 is capable of varying the space 122 between tiles 116. When the apexes of rod 120 fit within the apex of grooves 118 the space 122 is at a minimum. However, when the rod 120 is rotated to the position shown in FIGURE 8 wherein the flat faces of the hexagonal rod 120 are closest to the apexes of grooves 118, the space 122 will be at a maximum.

In FIGURES 8 and 9 there are illustrated two additional embodiments of the invention having several significant differences from the embodiments illustrated in FIGURES 3–7. The main difference with these embodiments is that the spacing means is an integral part of the refractory tile itself, taking the form of spaced, parallel ridges having planar surfaces on one or both surfaces of the tiles. As shown, these tiles are arranged with their edges parallel rather than overlapping (as in FIGURES 3–7), and locking tiles are employed to hold the other tiles in place.

In FIGURE 8, refractory tiles 130 have spaced, parallel ridges 132 on one side thereof. One end of each tile is filleted as at 138, and the other end is filleted as at 139, fillet 138 being on the side opposite to ridges 132 and fillet 139 being on the same side of the tile as ridges 132. Locking tile 134 is provided with staggered, semicircular ridges 136 on each side thereof, the center-to-center distance between ridges 136 on either side being equal to two thicknesses of tile 130, including ridges 132. All tiles 130 are exactly the same, but alternate rows of tiles are revolved 180 degrees so that the fillets at the ends thereof engage the ridges 136 on the locking tiles as shown. As is clear from FIGURE 8, the gaps formed by ridges 132 and the planar surfaces of tiles 130 are similar to the gaps illustrated in FIGURES 3–7 and have the same operating advantages as set forth in connection with those embodiments.

In FIGURE 9 there is shown an embodiment of the invention wherein both sides of tiles 140 have spaced parallel planar ridges 142, 148 and, in contrast to the previous embodiments, spacing ridges 142, 148 are directly opposite each other, so that ridges on opposing tiles are in contact on their facing surfaces, each ridge accounting for one-half the width of the gap. In this embodiment, the design of locking tile 144 is somewhat simpler, spaced, parallel ridges 146 having a width equal to the gap width and spaced a tile-thickness apart fulfilling the same function as locking tile 134 in FIGURE 8. Also, as can be seen from FIGURE 9, the ridges 146 are directly opposite each other, rather than being staggered as with ridges 138 on locking tile 134.

It will be clear to those skilled in the art that certain combinations of features of the various embodiments described hereinabove are possible. For example, the in-line arrangement of the gaps in FIGURE 9 could be employed with the other embodiments, or, conversely, the ridges 142, 148 in FIGURE 9 could be staggered on opposite sides so that the gaps themselves are staggered. It also will be understood that various other changes in the details, steps, materials and arrangements of parts, set forth hereinabove for purposes of describing and illustrating the invention, may be made by those skilled in the art within the scope of the invention as defined in the appended claims.

What is claimed is:

1. A regenerative mass for use in a regenerative furnace comprising:
    a plurality of refractory tiles, said tiles being arranged in a plurality of layers, said layers being in parallel planes spaced from each other; and
    spacing means between said layers, said spacing means defining with said tiles a plurality of narrower planar passages within each space between adjacent layers, each of said plurality of passages in the spaces between each of said layers being separate from the other passages in the same space and adjacent spaces.

2. The regenerative mass as claimed in claim 1, wherein said tiles have facing planar surfaces, said planar surfaces having longitudinally extending grooves therealong, and said spacing means include a rod placed between mating longitudinally extending grooves of facing adjacent tiles to position and interlock said tiles to form said passages.

3. The regenerative mass as claimed in claim 2, wherein said rod has outer peripheral surfaces in contact with the grooves in said tiles, said grooves having a contour different from the contour of said rod peripheral surface to achieve line contact between said rod and said tiles.

4. The regenerative mass as claimed in claim 3, wherein said rod is circular in cross section, said grooves being arcuate in cross section, said arcuate grooves having a radius greater than the radius of said rod.

5. The regenerative mass as defined in claim 3, wherein said grooves are V-shaped, said rod being circular in cross section.

6. The regenerative mass as claimed in claim 3, wherein said grooves are semi-hexagonal in shape.

7. The regenerative mass as claimed in claim 2, wherein said grooves are rectangular in cross section, said rod having a thickness greater than the sum of the depths of said grooves.

8. The regenerative mass as claimed in claim 2, wherein said rod has a first thickness in a first direction greater than a second thickness taken in a second direction, said rod being rotatable to a position in which said thickness spans mating grooves of adjacent tiles to define a first passage, said rod being rotatable to second position which said second thickness spans mating grooves to define a second passage different from said first passage.

9. The regenerative mass of claim 2 wherein the mating grooves of adjacent spaces between said tiles are offset from each other.

10. A regenerative mass comprising:
    a plurality of tiles having two planar surfaces, a plurality of longitudinally extending, spaced, parallel ridges on at least one of the surfaces of each tile, the tiles being arranged in a plurality of layers, said layers being in parallel planes spaced from each other, the ridges on the surfaces of a tile in one layer contacting a surface of a tile in the next adjacent layer, to define a plurality of distinct parallel passage within each space between adjacent layers, each of said plurality of passages in the spaces between each of said layers being separate from the other passages in the same space and adjacent spaces; and
    refractory locking tile means spanning the ends of the tiles to lock said tiles in a spaced parallel relation.

11. The regenerative mass of claim 10 wherein said locking tile means have longitudinally extending, spaced, parallel ridges, said ridges extending into the spaces between adjacent tiles.

12. The refractories as claimed in claim 11, wherein said ridges on said tiles are substantially rectangular in cross-section.

13. The refractories as claimed in claim 11, wherein said ridges on said locking tiles are substantially hemispherical in cross-section and broader at their bases than said spaces, the ends of said facing tiles adjacent said ridges on said locking tiles being shaped to accommodate said ridges.

14. The refractories as claimed in claim 11, wherein said locking tiles have said ridges on opposing, parallel sides thereof, whereby said locking tiles are operable to secure a plurality of tiles on each of said sides.

References Cited

UNITED STATES PATENTS

| | | | |
|---|---|---|---|
| 1,703,793 | 2/1929 | Stein | 263—51 |
| 3,087,797 | 4/1963 | Bogart | 23—277 |

FOREIGN PATENTS 916,582   1/1963   Great Britain.

JAMES H. TAYMAN, JR., *Primary Examiner.*